Nov. 11, 1958   G. H. BERTHOLD ET AL   2,859,480
METHOD OF TREATING POLYETHYLENE SHEET MATERIAL
Filed Dec. 13, 1954
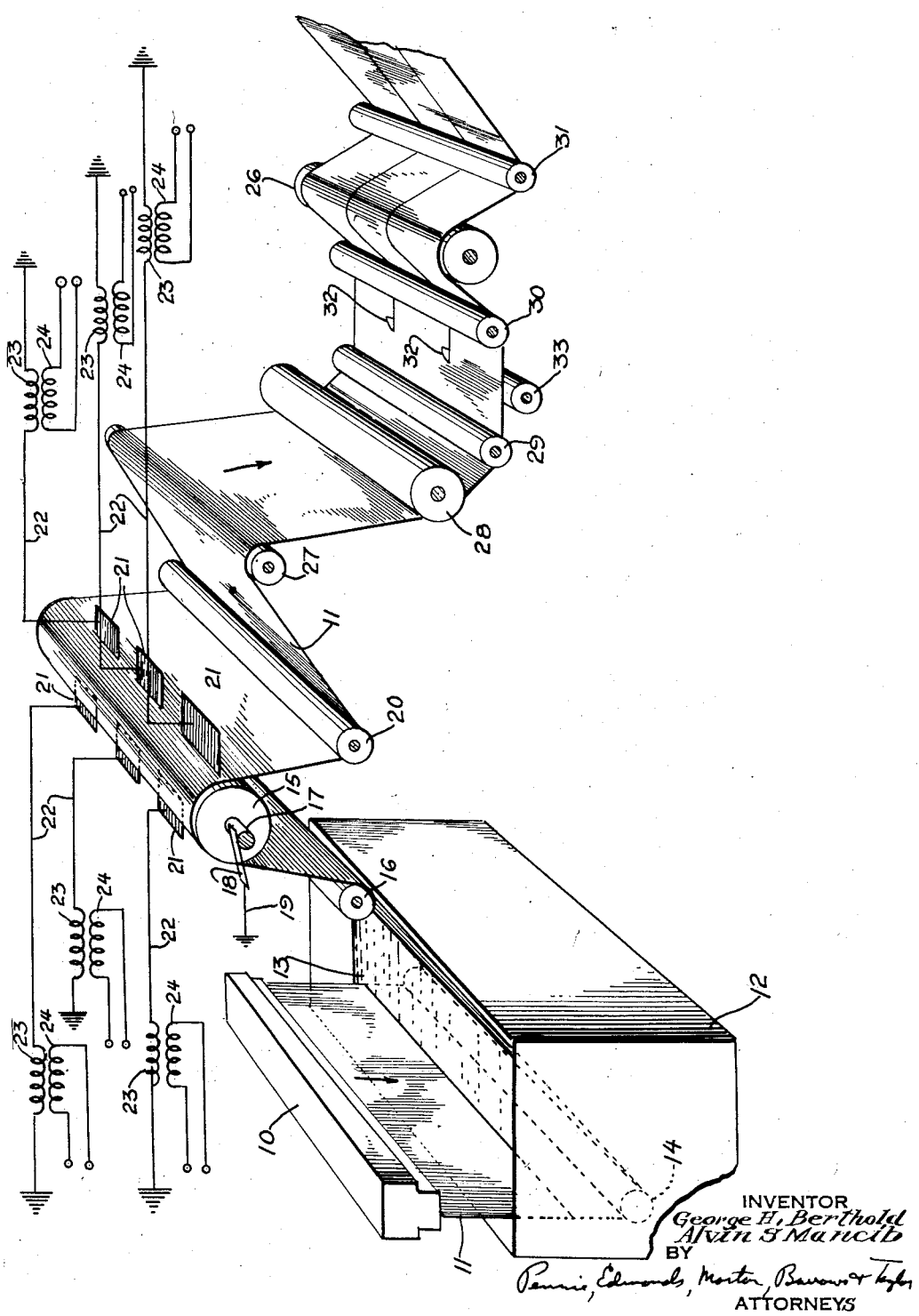
INVENTOR
George H. Berthold
Alvin S Mancib
BY
Pennie, Edmonds, Morton, Barrows & Taylor
ATTORNEYS 2,859,480

METHOD OF TREATING POLYETHYLENE SHEET MATERIAL

George H. Berthold, Guilford, Conn., and Alvin S. Mancib, Winchester, Mass., assignors to Olin Mathieson Chemical Corporation, New Haven, Conn., a corporation of Virginia Application December 13, 1954, Serial No. 474,904

12 Claims. (Cl. 18—48)

This invention relates to a method of treating plastic materials in various structural forms to improve the anchorage characteristics of the surfaces thereof, more especially relating to the treatment of polyethylene, principally in sheet or film form, to improve the anchorage characteristics of its exposed surface whereby various coating materials such as printing ink may be more firmly secured thereto. In particular the invention is concerned with an improvement in the treating method fully disclosed and claimed in copending application Ser. No. 359,352 filed on June 3, 1953 and assigned to the same assignee as is this invention.

The treating method disclosed in the aforementioned copending application broadly involves subjecting the surface of an article to be treated to an electric glow discharge, advantageously a continuous high frequency and high voltage glow discharge. While not limited thereto of course, this treating method contemplated treatment of the surface of the article substantially at room temperature and further contemplated the treatment of the article entirely independently of the manufacture or formation of the article, and normally a substantial length of time thereafter. We have now discovered that substantial economies can, however, be effected if the treatment is carried out at elevated temperatures. We have also discovered that the treatment can be carried out substantially immediately following formation of the article to be treated.

Hence our invention broadly contemplates a method of treating plastic structures, for example a polyethylene film, to improve the anchorage characteristics of a surface thereof which comprises passing the surface through an electric glow discharge while its temperature is substantially above room temperature. More specifically it contemplates both the treatment of preformed plastic structures which are at room temperature by first increasing the temperature thereof and the treatment of newly formed plastic structures, which have been formed at elevated temperatures, prior to permitting them to cool to room temperature. There would appear at this time to be no substantial difference between the results achieved, that is, the results achieved would appear to be the same when the glow discharge treatment is effected immediately after formation of the plastic article before it has cooled to room temperature and when the treatment is performed only after heating an already cooled article to an elevated temperature above room temperature.

For a more detailed description of this invention, reference may be had to the accompanying drawing in which there is diagrammatically illustrated in perspective one form of apparatus by which the method of the invention may be carried out. An apparatus similar in principle at least to the apparatus here only diagrammatically illustrated is fully disclosed and claimed in copending application Serial No. 474,903, filed Dec. 13, 1954 assigned to the assignee of the present application.

The apparatus illustrated comprises a conventional polyethylene film extruder 10 to which raw polyethylene in granular form is fed. It is heated to a molten state in the extruder and then forcibly ejected therefrom through an extrusion head in the form of a thin film 11 of substantially uniform thickness. The film 11 drops downwardly from the extruder into a quench tank 12 containing a coolant bath 13 which is generally water.

An idler roll 14 is located within the tank substantially below the surface of the water therein to assure that the film 11 which passes thereabout is sufficiently submerged. A smooth surfaced roll 15, preferably made of stainless steel, is positively driven by means not shown to withdraw film 11 from the quench tank over an idler roll 16. Roll 15 is grounded by having its suporting shaft 17 electrically connected by a brush 18 and a ground conductor 19 to ground. After leaving grounded roll 15, film 11 passes over another idler roll 20.

In passing over grounded roll 15, the film is subjected to the electric glow discharge treatment by which the anchorage characteristic of its exposed surface is improved. As illustrated, this treatment is accomplished by means of six electrodes 21, each of which is supplied with a high voltage high frequency current through conductor 22 from the secondary winding 23 of a high voltage transformer, the primary winding 24 of which is secured to a suitable source of current. The electrodes 21 are mounted three on each side of grounded roll 15 in a plane slightly above a horizontal plane passing through the axis of the grounded roll. The electrodes supported on one side of the grounded roll are positioned to lie opposite the spaces between and adjacent the electrodes on the other side of the ground roll and in aggregate are in length substantially equal to the width of the film whereby the entire exposed film surface may be subjected to treatment. The mounting of the electrodes including the location thereof is fully disclosed and claimed in copending application Ser. No. 474,903 mentioned above and forms no part of the present invention. The spacing of the electrodes from the grounded roll 15, or in other words the gap across which the glow discharge is formed, is preferably the same as that recommended in copending application Ser. No. 359,352.

After leaving idler roll 20, the film is drawn by driven roll 26 over a series of idler rolls 27, 28, 29 and 30. Though not shown, driven roll 26 is driven by the same means as is grounded roll 15 and at a rate such that its peripheral speed is the same. After discharge from driven roll 26, the film is drawn around an idler roll 31 to a conventional windup apparatus not illustrated.

In passing over idler rolls 29 and 30, the film may be cut longitudinally by slitting knives 32 which are adjustably mounted on a support 23 located opposite the surface of film 11 remote from that which engages rolls 29 and 30.

One of the obvious economies which is effected by use of the above-described apparatus is a saving in labor. Hence formation of the film and surface treatment thereof is carried out in one continuous operation without requiring the intermediate steps of handling and storing the formed film and then handling it again for surface treatment. Another obvious economy effected by employment of the above-described apparatus lies in the fact that for the new electrical treatment we have discovered involving treatment of the film while at a temperature above room temperature, no energy must be employed to raise the temperature of the film from room temperature to the desired temperature because in leaving the quenching medium the film is at a temperature lying within the desired range and is treated prior to a cooling thereof to room temperature.

Both of the above economies of course result directly from treating the film substantially immediately after the formation thereof. A third economy which we will now discuss is effected, however, independently of the above by carrying out the electrical glow discharge treatment of the film while the latter is at an elevated temperature above room temperature. This is in no way dependent upon treatment of the film immediately after formation thereof as it is obtained, as we have heretofore suggested, equally as well by the treatment of film that is aged and is at room temperature and is then heated to an elevated temperature prior to subjection to the electrical glow discharge. Hence the invention is not limited to the electrcal glow discharge treatment of newly formed and uncooled film, but applies equally as well to aged film that is heated to an elevated temperature.

Furthermore, while in the apparatus illustrated a plurality of electrodes is employed, the method of the invention may equally as well be carried out with the employment of but one electrode as described in copending application Ser. No. 359,352. The use of the plurality of electrodes gives added advantages in the form of further economies as fully described in the copending application Ser. No. 474,903 but does not form a part of this invention. An apparatus in which they are employed is illustrated because they will probably be employed henceforth for the reasons set forth in copending application Ser. No. 474,903.

As heretofore mentioned, the primary object of this invention is to effect an economy in the power required to treat the surface of a polyethylene structure. This we have discovered can be accomplished in accordance with the method of copending application Ser. No. 359,352 if, during the electrical treatment prescribed thereby, the polyethylene is at an elevated temperature whether it has been heated thereto from room temperature or is taken directly from the forming operation and treated prior to cooling thereof. Hence the same degree of adherability can be given the surface of a polyethylene film by treatment in accordance with this invention as was given it when treated cold by the method of the copending application but with the employment of considerably lower current strengths in the electrode circuits. This can be proved experimentally in either of two ways. First it can be proved by a comparison of the power required to obtain a particular degree of adherability when treating a given film at room temperature and the power required to get the same degree of adherability when treating the same film at an elevated temperature; or, secondly, it can be proved that with a given amount of power the degree of adherability is greater when the film is treated at an elevated temperature than when treated cold. We shall set forth below the results of numerous experimental tests, some of each category, from which it will be seen that the power consumption or energy required to satisfactorily treat film when heated is substantially less than that required to satisfactorily treat the same film cold.

As a measure of the adherability of the treated film surface we have employed the same test as that set forth in copending application Ser. No. 359,352. This test involves placing printing ink upon the treated surface as by rolling such ink thereon to simulate the application that would be made by conventional printing equipment, the ink being one such as an aniline dye printing ink. The ink is then allowed to dry and a strip of Scotch tape is applied to the so treated surface with enough pressure to assure complete adhesion. The tape is then stripped at a constant rate and the improvement in the anchorage or adherence characteristics of the surface can be gauged by the amount of ink that is removed by the tape. An untreated surface, when subjected to such a test, will normally release large quantities of ink. To indicate a completely satisfactory treatment of polyethylene by our treating process we require a substantially 100% retention by the polyethylene surface of the ink applied when subjected to such test.

*Example I*

Three samples of 1.5 mil. thick film made of a film-forming commercial grade of polyethylene were treated under identical conditions except with respect to temperature. Thus they were all treated with the use of the same electrode spaced a distance of .033 inch from the ground roll, each sample being passed between the electrode and ground roll, in direct contact with the surface of the latter, at a speed fo 50 feet per minute. The primary circuit was supplied with a current of .4 amp. at 170 volts and at a frequency of 2600 cycles per second. The current in the secondary or electrode circuit was about 0.015 amp. and the voltage 3400 volts. The first sample was treated at a temperature of 80° F. When subjected to the Scotch tape test, it exhibited a 30% ink retention. The second sample was treated after being heated to 132° F. It exhibited a 90% ink retention. The third sample was treated after being heated to 158° F. and exhibited an ink retention of 90%. As indicated, all samples were of old or aged film. While even those of the above samples which were treated at elevated temperatures were not so treated as to have perfect surface anchorage characteristics, a comparison of them does show the improvement in treatment effected by the elevation in temperature prior to and during treatment.

Further tests showed that treatment of the film at the two elevated temperatures resulted in 100% ink retention with the use of higher currents, corresponding to 0.6 amp. in the primary circuit. In contrast, 100% ink retention in film treated at 80° F. required an increase of the primary current to 0.72 amp., at which level there were frequent arcs through the film, and burning thereof.

*Example II*

Two other samples of the same film as employed above in Example I were treated at a speed of 48 feet per minute. Each sample had been aged for 48 hours at room temperature. The current supplied to the primary circuit in each case was .5 amp. at 150 volts. The transformer imparted a voltage to the secondary or electrode circuit of 3000 volts. The ink retention of the first sample, after treatment at 77° F., was 20%. The second sample was treated at a temperature of 127° F. and exhibited an ink retention characteristic of 100%. While treating film at 77° F., increase of the primary current to 0.65 amp. still resulted in ink retention of only 25%.

*Example III*

Three further samples of the polyethylene film described in Example I above were treated at the same speed as therein set forth but under the following treating conditions: The current in the primary circuit in each case was .6 amp. while the voltage was 174 volts. The current in the secondary or electrode circuit was about .025 amp. and the voltage 3480. The first of these samples was treated at a temperature of 80° F. and after treatment exhibited 90% ink retention. The second sample was treated at 132° F. and exhibited a 100% ink retention. The third sample was treated at 158° F. and exhibited an ink retention of 100%.

From this example and Example I it will be noted that while considerable improvement in treatment is accomplished by increasing the temperature to a certain degree above room temperature, a further increase does not show any apparent further improvement.

*Example IV*

In this experiment, two 1.5 mil. thick samples of film made from the same polyethylene were treated with the same apparatus as employed above, the speed of travel of the samples being at 48 feet per minute. The treatment in both instances was carried out with the primary circuit provided with a .5 amp. current at 150 volts. The first sample was a film that had been made and had aged for 48 hours at room temperature. After treatment at room temperature, it exhibited an ink retention characteristic of 20%. The second sample was treated substantially immediately after extrusion and quenching and was at the time of treatment at a temperature of about 160° F. It, however, exhibited an ink retention characteristic of 100%.

While we do not wish to be limited thereto, we believe that the reasons the anchorage or adherence characteristic of the surface of a film may be improved to the point that it exhibits a 100% ink retention when subjected to the above-described Scotch tape test with lower power requirements if the treatment is carried out on film at a temperature substantially above room temperature are (1) that at the higher temperature the dielectric strength of the film is substantially reduced, and (2) at the higher temperature the static charge on the film that has to be overcome is substantially reduced. The latter is particularly true if the film is treated immediately after emergence from the quench bath and while it is in a humid atmosphere. For both reasons an electric glow or corona discharge may be formed in the gap between an electrode and a grounded roll with a substantially lower power input.

In connection with the reduction of the static charge on the film as a result of the treatment thereof at an elevated temperature, we find that an important advantage of our improved process is the elimination of the grounded roll insulation used in previous processes. In treating polyethylene at room temperatures, a high current is required as indicated to maintain a corona discharge adequate for treatment. This high current is necessary to offset that part of the discharge which is required to eliminate static electricity which has accumulated on the rapidly travelling film. Frequently, the current used to secure a high degree of treatment of such a film is at a level sufficiently high to exceed the dielectric breakdown strength thereof. When this occurs the discharge arcs to the grounded roll and a hole is burned in the film. To overcome this undesirable feature, it is necessary to wrap the grounded roll as indicated in application Ser. No. 359,352 with an insulating material which prevented the arcing through and burning of the film. Such wrappers are generally effective for periods up to 24 hours, and had to be replaced after failing.

We have found that in the process of the present invention, however, the problem of static electricity is eliminated because the treatment is carried out at an elevated temperature, particularly when treating freshly extruded film. It is therefore possible to maintain a corona discharge, which produces films of satisfactory adherability, at current levels substantially less than were previously necessary, thus avoiding any danger of burning through the film. We have found as a result that there is no problem with respect to arcing through and burning of the plastic under treatment at an elevated temperature even when the plastic is passed over the grounded roll in direct contact with its metallic surface.

Though no critical temperature has been found at or above which the treatment may be carried out with a sharp increase in percentage of ink retention resulting, it is our belief that substantial power savings can be accomplished only if the temperature of the film or other article being treated is at least above 115° F.

Furthermore the same broad electrical conditions set forth in copending application Ser. No. 359,352 apply to the treatment of this invention, namely:

Voltage impressed upon electrode__ About 3,000 volts to about 22,00 volts.
Frequency in the electrode circuit__ About 500 cycles per sec. to about 17,500 cycles per sec.
Current in the electrode circuit___ About .0015 amp. to about .125 amp.
Gap between electrode and grounded roll_____ About .020 to .060 in.
Speed of surface to be treated_____ About 40 to 240 feet per minute.

We claim:

1. The method of producing without substantial structural reformation a polyethylene structure a surface of which is to exhibit superior anchorage characteristics which comprises passing said structure at a temperature of at least 115° F. through an electric glow discharge.

2. The method according to claim 1 in which the electric glow discharge is formed between a grounded support for the polyethylene structure and an electrode and in which the potential of the electrode is between 3,000 and 22,000 volts, and in which the strength of the discharge current is between .0015 ampere and .125 ampere.

3. The method according to claim 2 in which the electrode is spaced from the support a distance of .020 to .060 inch and the frequency of the discharge current is between 500 cycles per second and 17,500 cycles per second.

4. The method of producing without substantial structural reformation a polyethylene structure a surface of which is to exhibit superior anchorage characteristics which comprises establishing an electric glow discharge between an electrode and a grounded support and passing said structure at a temperature of at least 115° F. through said glow discharge.

5. The method according to claim 4 in which the strength of the discharge current is between .0015 ampere and .125 ampere.

6. The method according to claim 5 in which the electrode is spaced from the support a distance of .020 to .060 inch and the frequency of the discharge current is between 500 cycles per second and 17,500 cycles per second.

7. The method of producing without substantial structural reformation a polyethylene structure a surface of which is to exhibit superior anchorage characteristics which comprises heating said structure to a temperature of at least 115° F. and passing it at said elevated temperature through an electric glow discharge.

8. The method according to claim 7 in which the electric glow discharge is established between an electrode and a grounded support, in which the potentail of said electrode is between 3,000 and 22,000 volts and in which the current in the electrode circuit is from about .0015 ampere to about .125 ampere.

9. The method of producing without substantial structural reformation a polyethylene structure a surface of which is to exhibit superior anchorage characteristics which comprises forming said structure from molten polyethylene, and before cooling said structure to a temperature below 115° F. but without substantial structural reformation thereof passing it through an electric glow discharge.

10. The method according to claim 9 in which the electric glow discharge is established between an electrode and a grounded support for said structure, in which the potential of the electrode is from 3,000 to 22,000 volts, in which the frequency in the electrode circuit is from 500 cycles per second to about 17,500 cycles per second, in which the current in the electrode circuit is between .0015 ampere and .125 ampere, in which the electrode is spaced from said grounded support a distance of from between .020 to .060 inch, and in which the rate of travel of the surface of the polyethylene structure through the glow discharge is between 40 and 240 feet per minute.

11. The method of producing a polyethylene film, one surface of which has superior anchorage characteristics, which comprises forming said film by extrusion thereof from a mass of molten polyethylene, passing said extruded film through a quench bath, removing said film from said quench bath and substantially immediately thereafter passing said film at a temperature of at least 115° F. and while still moist through an electric glow discharge formed between an electrode and a grounded support to improve the anchorage characteristics of at least one surface thereof without reforming the film to any substantial extent.

12. The method of producing without substantial structural reformation a polyethylene structure a surface of which is to exhibit superior anchorage characteristics which comprises establishing an electric glow discharge between an electrode and a metallic grounded support and passing said structure at a temperature of at least 115° F. through said glow discharge while in direct contact with the metallic surface of the support.

References Cited in the file of this patent

UNITED STATES PATENTS

| | | |
|---|---|---|
| 2,461,975 | Fuller | Feb. 15, 1949 |
| 2,608,717 | Kay | Sept. 2, 1952 |

FOREIGN PATENTS

| | | |
|---|---|---|
| 510,068 | Belgium | Apr. 25, 1952 |
| 1,058,934 | France | Mar. 19, 1954 |